UNITED STATES PATENT OFFICE.

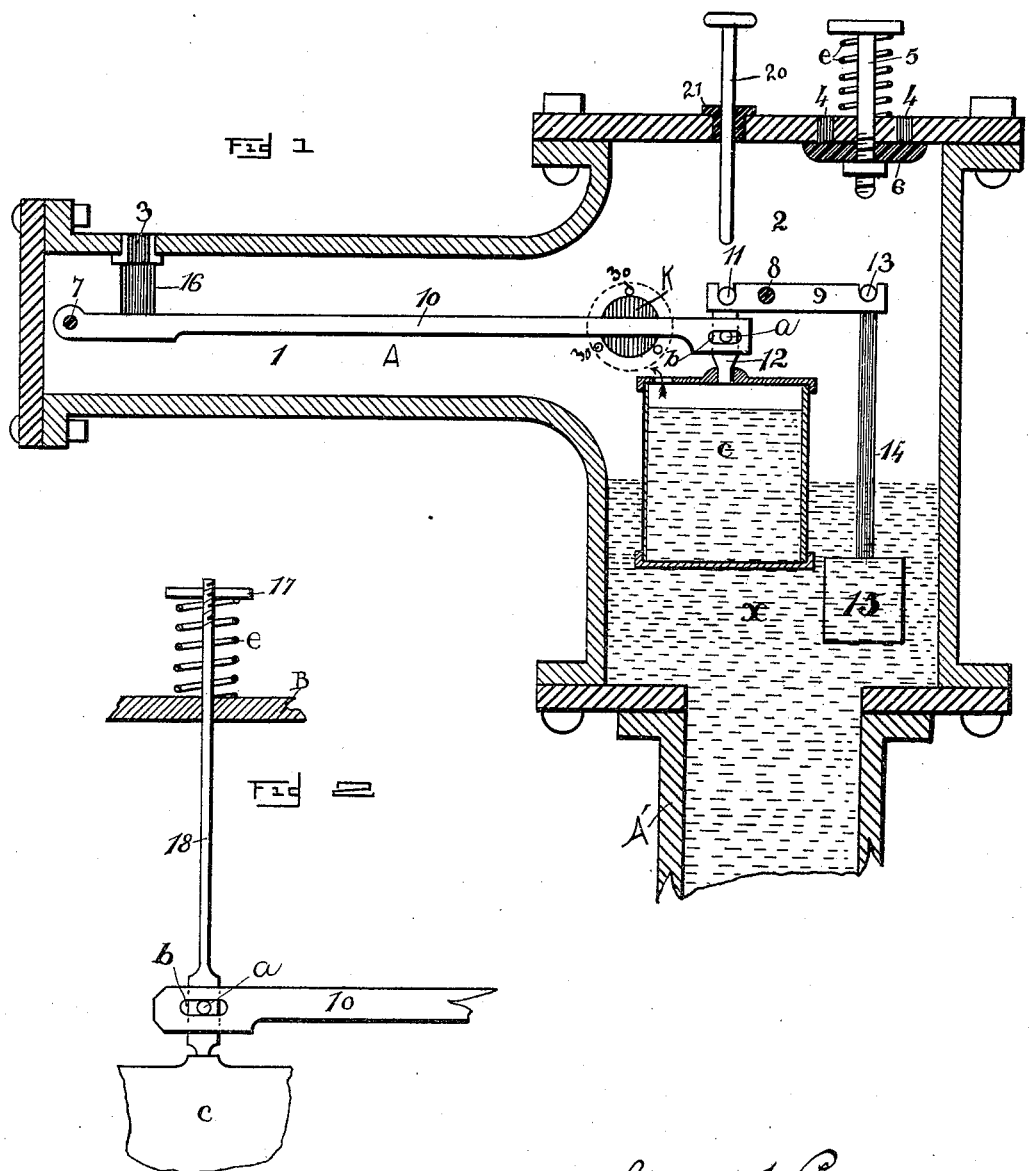

GEORGE T. PRINCE, OF OMAHA, NEBRASKA.

AIR-RELIEF VALVE.

SPECIFICATION forming part of Letters Patent No. 618,904, dated February 7, 1899.

Application filed November 27, 1897. Serial No. 659,985. (No model.)

*To all whom it may concern:*

Be it known that I, GEORGE T. PRINCE, residing at Omaha, in the county of Douglas and State of Nebraska, have invented certain useful Improvements in Air-Relief Valves; and I do hereby declare that the following is a full, clear, and exact description of the invention, such as will enable others skilled in the art to which it appertains to make and use the same, reference being had to the accompanying drawings, which form a part of this specification.

This invention has relation to an improvement in valves to provide an automatic relief to be used in conjunction with water-mains or other pipe system and is adapted to provide an automatic regulating mechanism by means of which the air collecting at the highest points may be allowed to escape.

In the furtherance of the aim of my invention I provide within an extension of the pipes and preferably at the highest point within the system one or more chambers, within which is suspended a pivoted lever having a main weight and an auxiliary weight, which are adapted to counterbalance one another and which are held in stability under certain conditions, which when they are changed destroys the equilibrium of the pivoted lever, which acts in the manner of a scale-beam to automatically open an air-valve to restore the equilibrium, as will be described more fully hereinafter.

In the accompanying drawings, Figure 1 shows a sectional view of my device as secured to a water-main section, while Fig. 2 shows a modification of my device.

To an upward projection A' of an ordinary pipe system I secure a housing A, comprising the main chamber 2 and the extension 1, at or near the end of which I provide an escape-opening 3 and a little beyond the same a shaft 7, preferably passing transversely through this extension 1, which may be circular in cross-section or of any other suitable conformation. So, also, may the chamber 2 be round, square, or of any other shape in outline. At a point preferably near the center and held within the main chamber 2 is a shaft 8, which shaft in turn gives support to the pivoted lever 9, fixed to the shaft, allowing a vibrating movement. This pivoted lever 9 has two seatings, one at each end, within which are held the trunnions 11 and 13, the former forming part of the hanger 12 and the latter a part of the depending bar 14. In the arrangement of this lever 9 I prefer having the trunnion 11 somewhat nearer the transverse bar 8.

Forming part of the depending bar 14 is a weight 15, of any suitable material, while forming part of and secured to the hanger 12 is a main-weight chamber $c$, in the form of a vessel, which is to be preferably wholly filled with the fluid $x$ within the pipe system, a vent-opening being provided within the weight-chamber $c$, as is indicated in the top by the arrow. This arrangement of the vibrating lever 9, the depending weight 15, and the depending main-weight chamber $c$, which is in the form of a vessel, would comprise the main features of my invention.

Under ordinary conditions the fluid $x$ is permitted to press upward into the chamber 2 a suitable distance, so that the auxiliary weight 15 would be entirely submerged, while but approximately half of the main weight is submerged. Under these conditions the pivoted lever 9, which acts as a lever, is supposed to be in a horizontal position. Now should the air accumulate within the chambers 1 and 2 the elevation of the water-line would be gradually forced downward and destroy the equilibrium of the two counterbalanced weights, for as the water-line receded the partially-submerged main-weight chamber would increase in weight relatively to raise the auxiliary weight 15. As soon as the liquid were allowed to reënter the chamber 2 the main-weight chamber $c$ would again be carried up to reëstablish the equilibrium. This action of two counterbalanced weights, one wholly and one partially submerged, is utilized to actuate a valve.

Extending from the shaft 7 is a second lever in the form of a valve-beam 10, which is provided with a slot $b$, through which works a pin $a$, forming part of the hanger 12, and secured to the top and below the escape-opening 3 is a valve 16, which instrumentalities are so arranged that when the main-weight chamber $c$ is being forced upward, in which condition the lever 9 is in a horizontal position, and the second lever 10 is also in a horizontal position and is tightly forcing the valve 16 against the escape-opening.

Now should at any time the air accumulate within the chamber 2, as described, to force downward the water-level, and so cause a receding of the main-weight chamber c to destroy its equilibrium, the lever 10 would also be carried downward by means of the hanger to allow an instant escape of the air within the chambers 1 and 2. This would at once cause an upward rush of the waters, which would rise a little above the metacenter of the weight-chamber c and so hold the same under tension, as it were, to permit a tight connection and impact between the valve 16 and the escape-opening 3.

To make a test as to the operativeness of the device, the inspector simply depresses the stem 20, working in the stuffing-box 21, so as to depress the chamber c. The stem must be drawn upward to permit the operation of the levers.

To prevent a partial vacuum forming in the pipes, I provide an ordinary collapse-valve comprising the disks 6, the tension of which is adjusted by means of the headed stem 5, forced upward by means of an ordinary coil-spring e, the top B of the vessel being provided with suitable escape-openings.

The device is exceedingly simple of construction and after once being properly set needs practically no readjusting.

The device may be simplified and the weights C be held in proper position by means of a stem 18, referring now to Fig. 2, which would be secured to the main-weight chamber c, which above would be counterbalanced by means of a spring e, adjusted by means of the head 17, threading upon the stem 18. In this connection the scale-beam 9 and the auxiliary weight would be dispensed with.

In referring to Fig. 1 the main housing A at a suitable point is provided with a relief-valve K, secured by suitable screws 30, which is used to allow air in large volumes to escape during the process of filling the main with water. This valve is an ordinary valve and under ordinary conditions is closed and is not an essential part of my invention, it simply being opened when the mains are filled to facilitate the escape of the air in the main.

Now, having thus described my said invention, what I claim as new, and desire to secure by United States Letters Patent, is—

1. The combination with a partially-liquid-filled housing, of a lever pivoted within said housing, a submerged weight extending from one end of said lever, a chamber extending from the remaining end of said lever and being partially immersed in said liquid, a second lever pivotally held within said housing and movably connected to said partially-immersed chamber and an air-relief valve secured to said second lever as and for the purpose set forth.

2. The combination with a partially-liquid-filled housing of a lever positioned within said housing a weight extending from one end of said lever and being immersed in said liquid, a chamber extending from the remaining end of said lever and being partially immersed in said liquid, a second lever within said housing, an air-relief valve connected to and operated by said second lever, said second lever being connected to and operated by said partially-immersed chamber and means to mechanically operate said levers, from without, as and for the purpose set forth.

3. The combination with a partially-liquid housing of a collapsing valve within said housing, a lever pivotally supported within said housing, a submerged weight extending from one end of said lever, a chamber extending from the remaining end of said lever and being partially immersed in said liquid, a second lever pivotally held within said housing and movably connected with said chamber and an air-relief valve secured to said second lever.

In testimony whereof I affix my signature in presence of two witnesses.

GEORGE T. PRINCE.

Witnesses:
   GEORGE W. SUES,
   ANE M. ELLIJER.